(12) United States Patent
Chan et al.

(10) Patent No.: US 12,287,903 B1
(45) Date of Patent: Apr. 29, 2025

(54) PROTECTED DISPLAY OF A REQUESTED USER INTERFACE

(71) Applicant: Wells Fargo Bank, N.A., San Francisco, CA (US)

(72) Inventors: Huanchee Aaron Chan, Fort Mill, SC (US); Carrie Anne Hanson, Charlotte, NC (US); Dawn Sasse, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 371 days.

(21) Appl. No.: 18/061,306

(22) Filed: Dec. 2, 2022

(51) Int. Cl.
*G06F 21/00* (2013.01)
*G06F 21/62* (2013.01)
*G06F 21/84* (2013.01)

(52) U.S. Cl.
CPC .......... *G06F 21/6245* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 7,685,234 B2 | 3/2010 | Gottfried | |
| 8,566,208 B1 | 10/2013 | Cunningham et al. | |
| 10,049,227 B1 | 8/2018 | Sampson | |
| 10,684,738 B1 | 6/2020 | Sicora et al. | |
| 10,740,216 B1 | 8/2020 | Parent | |
| 10,747,894 B1 | 8/2020 | Cline | |
| 11,321,709 B1 * | 5/2022 | Kolchin | G06Q 20/108 |
| 11,544,362 B2 * | 1/2023 | Efremov | G10L 21/0208 |
| 11,546,661 B2 * | 1/2023 | Brannon | G10L 15/26 |
| 11,714,683 B1 * | 8/2023 | Roberts | G06F 9/5027 |
| | | | 709/223 |
| 2005/0138110 A1 * | 6/2005 | Redlich | G06F 21/6254 |
| | | | 709/201 |
| 2011/0249905 A1 | 10/2011 | Singh | |
| 2018/0158489 A1 | 6/2018 | Avedissian et al. | |

(Continued)

OTHER PUBLICATIONS

Goldsteen, Abigail et al. Application-Screen Masking: A Hybrid Approach. IEEE Software, vol. 32, issue: 4. https://ieeexplore.ieee.org/stamp/stamp.jsp?tp=&arnumber=7106392 (Year: 2015).*

(Continued)

*Primary Examiner* — Jeremiah L Avery
(74) *Attorney, Agent, or Firm* — K&L Gates LLP

(57) ABSTRACT

System, apparatus, and computer program products are disclosed for protected display of a requested user interface. In one aspect, a method includes receiving a protected mode display request to display the requested user interface in a protected mode, wherein the requested user interface comprises a plurality of data values; in response to the protected mode display request: (i) retrieving a data protection template for the protected mode display request, (ii) determining, based on the data protection template, one or more protected data values of the plurality of data values and one or more unprotected data values of the plurality of data values, (iii) for each protected data value, generating a masked representation, and (iv) generating a masked user interface that comprises: (a) each unprotected data value, and (b) each masked data value; and causing the masked user interface to be presented using a display device.

20 Claims, 11 Drawing Sheets

(56) References Cited

U.S. PATENT DOCUMENTS

| | | | |
|---|---|---|---|
| 2019/0266345 A1* | 8/2019 | Jeong | G06F 9/451 |
| 2020/0293685 A1* | 9/2020 | Levay | G06F 16/258 |
| 2020/0387995 A1 | 12/2020 | Bucciarelli | |
| 2021/0303718 A1 | 9/2021 | Singh | |
| 2021/0344660 A1 | 11/2021 | Benkreira | |
| 2023/0229790 A1* | 7/2023 | Mozer | G06F 21/53 |
| | | | 726/26 |
| 2023/0300114 A1* | 9/2023 | Bhallamudi | H04L 63/10 |
| | | | 726/6 |

OTHER PUBLICATIONS

Sultana, Habiba; Kamal, A H M. An Edge Detection Based Reversible Data Hiding Scheme. 2022 IEEE Delhi Section Conference (DELCON). https://ieeexplore.ieee.org/stamp/stamp.jsp?tp=&arnumber=9753404 (Year: 2022).*

Ali, Osama; Ouda, Abdelkader. A classification module in data masking framework for Business Intelligence platform in healthcare. 2016 IEEE 7th Annual Information Technology, Electronics and Mobile Communication Conference (IEMCON). https://ieeexplore.ieee.org/stamp/stamp.jsp?tp=&arnumber=7746327 (Year: 2016).*

* cited by examiner

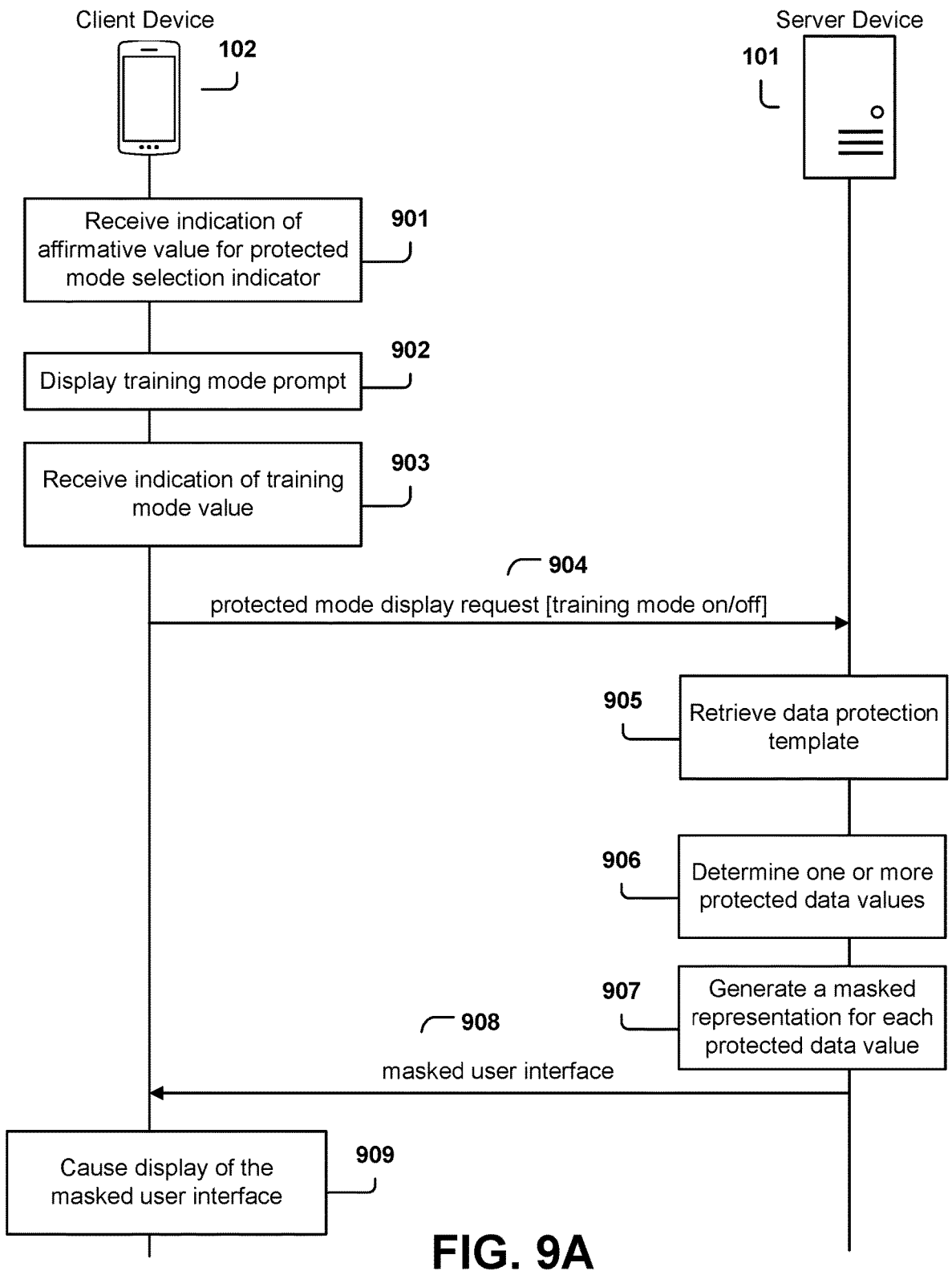

PROTECTED DISPLAY OF A REQUESTED USER INTERFACE

TECHNOLOGICAL FIELD

Example embodiments of the present disclosure relate generally to data security techniques and, more particularly, to systems and methods for secure display of user interfaces.

BACKGROUND

Conventionally, user interfaces on a device (e.g., smartphone, desktop computer, laptop, tablet, etc.) display the entirety of a user's data, regardless of device viewership. As such, these conventional techniques for user interface generation fail to provide techniques for secure and flexible display of user interfaces that contain sensitive information.

BRIEF SUMMARY

Users may interact with their client devices (e.g., smartphones, laptops, desktops, tablets, etc.) which are configured to display various user interfaces to the user. For example, a user may use their smartphone to open their mobile banking application to check their account balances, transfer funds, and/or perform other actions. In some instances, the user may require assistance to perform one or more of these actions, particularly if they are not particularly technology savvy. To receive such assistance, these users may interact with a third party (e.g., a bank representative, a family member, a friend, etc.), to request assistance but may unwittingly expose his/her sensitive data (e.g., account balance, financial account numbers, transaction history, etc.) via the user interface. Alternatively, a user may wish to show a third party how to perform certain actions via his/her client device but may be hesitant to as this would expose his/her sensitive data. Furthermore, this sensitive data is oftentimes not necessary to showcase how to perform a particular action and even in instances where the values of such sensitive data is relevant, there is not a requirement to showcase the particulars of the user's account. As such, it may be advantageous for a method of providing a protected display of a requested user interface, thus preventing unnecessary exposure of a user's sensitive data during periods of shared user interface viewership.

Provided herein are techniques for protected display of a requested user interface. The provided techniques enable secure and flexible display of user interfaces that contain sensitive information using masked user interfaces that are generated using data protection templates. As described below, in some embodiments, operations configured to generate masked user interfaces are performed on the server side, while in other embodiments operations configured to generate masked user interfaces are performed on the client side.

In some embodiments, a server device is configured to receive protected display mode requests from client devices, generate masked user interfaces in response to the protected display mode requests, and provide the masked user interfaces to the client devices. Accordingly, in some of these embodiments, the operations configured to generate masked user interfaces are done on the server side, and the server device is thus a user interface generator that generates user interfaces that are masked in accordance with defined data protection guidelines.

In some embodiments, the server device is merely configured to generate and provide unmasked user interfaces to client devices. In response to receiving an unmasked user interface, a client device may be configured to generate a masked user interface and display the masked user interface to a display device of the client device. Accordingly, in some of these embodiments, the operations configured to generate masked user interfaces are done using the client device.

In one example embodiment, a method is provided for protected display of a user interface. The method includes receiving, using communication hardware, a protected mode display request to display the requested user interface in a protected mode, wherein the requested user interface comprises a plurality of data values each associated with a respective data field of a plurality of data fields; in response to the protected mode display request, using user interface generation circuitry: (i) retrieving a data protection template for the protected mode display request, wherein the data protection template defines one or more protected data fields of the plurality of data fields, (ii) determining, based on the data protection template, one or more protected data values of the plurality of data values and one or more unprotected data values of the plurality of data values, wherein: (a) each protected data value is associated with a respective protected data field of the one or more protected data fields, (b) each unprotected data value is associated with a respective unprotected data field of one or more unprotected data fields, and (c) the one or more unprotected data fields comprise each data field of the plurality of data fields that falls outside the one or more protected data fields, (iii) for each protected data value, generating a masked representation, and (iv) generating a masked user interface that comprises: (a) each unprotected data value, and (b) each masked representation; and causing, using user interface generation circuitry, the masked user interface to be presented using a display device.

In another example embodiment, an apparatus is provided for protected display of a requested user interface. The apparatus includes communications hardware configured to receive, using communication hardware, a protected mode display request to display the requested user interface in a protected mode, wherein the requested user interface comprises a plurality of data values each associated with a respective data field of a plurality of data fields; in response to the protected mode display request, using user interface generation circuitry: (i) retrieve a data protection template for the protected mode display request, wherein the data protection template defines one or more protected data fields of the plurality of data fields, (ii) determine, based on the data protection template, one or more protected data values of the plurality of data values and one or more unprotected data values of the plurality of data values, wherein: (a) each protected data value is associated with a respective protected data field of the one or more protected data fields, (b) each unprotected data value is associated with a respective unprotected data field of one or more unprotected data fields, and (c) the one or more unprotected data fields comprise each data field of the plurality of data fields that falls outside the one or more protected data fields, (iii) for each protected data value, generate a masked representation, and (iv) generate a masked user interface that comprises: (a) each unprotected data value, and (b) each masked representation; and cause, using user interface generation circuitry, the masked user interface to be presented using a display device.

In another example embodiment, a computer program product is provided for protected display of a requested user interface. The computer program product includes at least one non-transitory computer-readable storage medium storing software instructions that, when executed, cause an apparatus to receive, using communication hardware, a protected mode display request to display the requested user interface in a protected mode, wherein the requested user interface comprises a plurality of data values each associated with a respective data field of a plurality of data fields; in response to the protected mode display request, using user interface generation circuitry: (i) retrieve a data protection template for the protected mode display request, wherein the data protection template defines one or more protected data fields of the plurality of data fields, (ii) determine, based on the data protection template, one or more protected data values of the plurality of data values and one or more unprotected data values of the plurality of data values, wherein: (a) each protected data value is associated with a respective protected data field of the one or more protected data fields, (b) each unprotected data value is associated with a respective unprotected data field of one or more unprotected data fields, and (c) the one or more unprotected data fields comprise each data field of the plurality of data fields that falls outside the one or more protected data fields, (iii) for each protected data value, generate a masked representation, and (iv) generate a masked user interface that comprises: (a) each unprotected data value, and (b) each masked representation; and cause, using user interface generation circuitry, the masked user interface to be presented using a display device.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

FIG. 9A illustrates a swim lane diagram of operations for protected display of a requested user interface using server side operations, in accordance with some example embodiments described herein.

DETAILED DESCRIPTION

Figure 1:
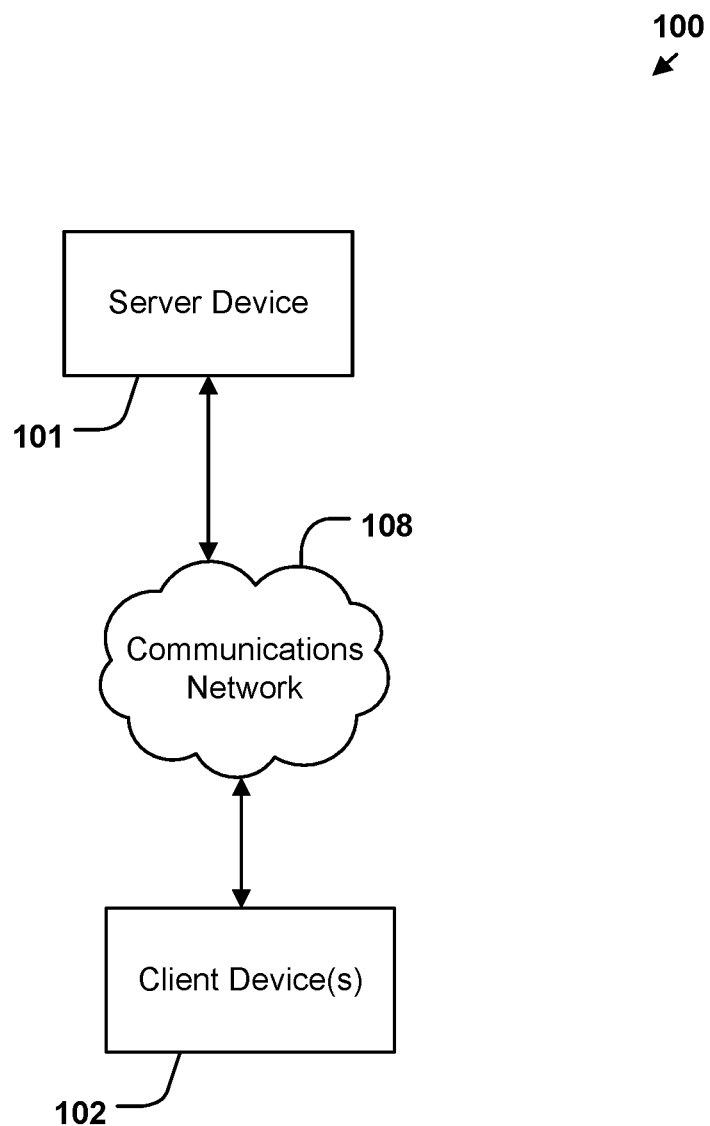
FIG. 1 illustrates a system in which some example embodiments may be used for generating and providing a protected display of a requested user interface, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "computer-readable medium" may refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "protected mode display request" may refer to a data construct that describes a request to view a requested user interface in a protected mode. In some embodiments, each user interface may be viewed in one of at least two display modes: in a protected mode, one or more protected data values of the user interface are masked, while in an unprotected mode none of the data values of the user interface are masked. In some embodiments, a protected mode display request is generated by a client device when a user of the client device requests to view a user interface while in the protected mode. For example, the user may request to display the user interface by clicking on a link and/or a button that is configured to indicate a request to display the request, where the clicking action is performed while a protected mode selection indicator describes an affirmative value (e.g., an "on" value).

The term "protected mode" may refer to a data construct that describes a mode of viewing/displaying a requested user interface that, when selected by a user of a client device, replaces some of the data values of the requested user interface with masked representations of those data values. In some embodiments, displaying a user interface in the protected mode comprises: (i) displaying one or more protected data values of the user interface using masked representations of the protected data values, and (ii) displaying one or more unprotected data values of the user interface using the original values of the one or more unprotected data values. In some embodiments, displaying a user interface in the protected mode enables the user to obtain assistance from a third party regarding how to interact with the user interface to perform a particular set of operations without revealing sensitive/confidential data values of the user interface to the third party. For example, if the user interface is part of an online banking platform provided by a financial institution to account holder users, then a particular account holder user can ask a third party (e.g., a bank representative) to view the user interface in the protected mode while teaching the account holder user about how to use the user interface to perform a particular task (e.g., to transfer money from one account to another account). In this example, while the user interface is being viewed in the protected mode, sensitive/confidential data values displayed by the user interface (e.g., account balance, recent transaction records, and/or the like) may be replaced with masked representations of those sensitive/confidential data values.

The term "protected mode selection indicator" may refer to a data construct that describes a latest/current user selection about whether to enable the protected mode for viewing user interfaces. In some embodiments, a user of a client device selects a protected mode by performing a user selection action that causes a protected mode selection indicator to describe an affirmative indicator value (e.g., an "on" value). For example, in some embodiments, the user selection action comprises toggling a protected mode selection user interface element to an affirmative state (e.g., an "on" state). In some embodiments, after the user performs the user selection action while viewing a user interface, the user interface is displayed using the protected mode. In some embodiments, after the user performs the user selection action while viewing a user interface, the current user interface as well as all of the user interfaces that the user requests to view after viewing the current user interface are displayed in the protected mode until the user performs a user un-selection action that causes the protected mode selection indicator to describe a negative indicator value (e.g., an "off" value). For example, in some embodiments, the user un-selection action comprises toggling a protected mode selection user interface element to a negative state (e.g., an "off" state). Accordingly, in some embodiments, if a requested user interface is part of a sequence of requested user interfaces that the user has requested to display, the affirmative indicator value for the protected mode selection indicator is determined based on a user selection action that is performed while a first requested user interface in the sequence was being displayed to the user.

The term "masked user interface" may refer to a data construct that describes a set of user interface elements that are configured to depict protected data values of a requested user interface using masked representations of those protected data values. In some embodiments, to generate a masked user interface for a requested user interface, the following operations are performed: (i) identifying a data protection template that can be used to determine one or more protected data values of the requested user interface and one or more unprotected data values of the requested user interface, (ii) for each protected data value, generating a masked representation that does not describe the protected data value, and (iii) generating the masked user interface to comprise each unprotected data value and each masked representation. In some embodiments, in a masked user interface that is generated based on a requested user interface, the arrangement of user interface elements corresponding to the unprotected data values and the arrangement of user interface elements corresponding to the masked representations is determined based on the arrangement of the unprotected data values and the arrangement of the protected data values in the requested user interface. In some of the noted embodiments, a masked user interface for a requested user interface is a user interface that comprises all of the user interface elements of the requested user interface in accordance with the display arrangement of those user interface elements except that, in the masked user interface, the protected data values of the requested user interface element are replaced with masked representations of those protected data values.

The term "data protection template" may refer to a data construct that describes which of the data values depicted by a user interface are designated as being protected data values. In some embodiments, a data protection template for a requested user interface can be used to determine one or more protected data fields of the requested user interface. In some embodiments, a data protection template for a requested user interface can be used to determine one or more protected data fields of the requested user interface. The data protection template may describe the one or more protected data fields as well as a masked representation type for each protected data field. For example, a protected data field may describe a redacted masked representation type, such that protected data field values corresponding to this protected data field will be blurred when displayed via a user interface. In some embodiments, the data protection template may also describe the one or more unprotected data field types. Alternatively, data field types not described by the data protection template may be determined to be unprotected data field types. In some of the noted embodiments, each protected data value of a protected mode display request is associated with a respective protected data field of the one or more protected data fields, each unprotected data value of a protected mode display request is associated with a respective unprotected data field of one or more unprotected data fields, and the one or more unprotected data fields comprise each data field whose data value is depicted by the requested user interface and falls outside the one or more protected data fields.

The term "protected data value" may refer to a data construct that describes a data value that is depicted by a user interface and is associated with a protected data field of the user interface as described by the data protection template for the user interface. In some embodiments, each user interface is configured to depict a set of data values for a set of data fields, where each data value is the value depicted by the user interface for a respective data field. For example, an account information user interface may be configured to depict an account balance data value for an account balance data field and an account number data value for an account number data field. In some embodiments, given a user interface that is configured to depict data values for a set of data fields, the data protection template for the given user interface may describe which of the data fields in the set of data fields are designated as being protected data fields and which of the data fields in the set of data fields are designated as being unprotected data fields. For example, given an account information user interface that is configured to depict an account balance data value for an account balance data field and an account number data value for an account number data field, the data protection template for the given account information user interface may describe that the account balance data field is a protected data field while the account number data field is an unprotected data field. In some embodiments, when a data value is associated with a protected data field, the data value is designated as being a protected data value, while a data value that is associated with an unprotected data field is designated as being an unprotected data value. For example, when the data protection template for an account information user interface may describe that the account balance data field is a protected data field while the account number data field is an unprotected data field, then the account balance data value that is depicted by the account information user interface may be designated as being a protected data value, while the account number data value that is depicted by the account information user interface may be designated as being an unprotected data value.

The term "masked representation" may refer to a data construct that describes a visual and/or data representation of a corresponding data value that does not describe the corresponding data value and/or cannot be used to detect what the corresponding data value is. A masked representation may be associated with a masked representation type, which describes the technique for masking a data value. In some embodiments, a masked representation type may be a redacted masked representation type or a synthetic masked representation type. In some embodiments, a masked representation corresponding to a redacted masked representation type for a respective protected data value comprises a mask user interface element, such a mask user interface element that depicts the user interface region associated with the respective protected value as a redacted region. A mask user interface element may visually obfuscate the protected data value, such as by blurring or overlaying a mask (e.g., a darkened box) over the protected data value. In some embodiments, a masked representation corresponding to a synthetic masked representation type for a respective protected data value comprises a masked data value that is different from the respective protected data value. In some embodiments, the masked data value is a randomly-generated synthetic data value. In some embodiments, the masked data value is determined based on a probability distribution whose parameters (e.g., whose mean and/or standard deviation) are determined based on the respective protected data value. In some embodiments, the masked data value is determined based on one or more other data values (e.g., unprotected data values, protected data values, and/or masked data values). For example, a masked data value of 1000 for a user account balance data field type (e.g., a protected data field) and an unprotected data value of 600 for a withdrawal amount data field type (e.g., an unprotected data field) may be used to generate a masked data value of 400 for a remaining balance data field type (e.g., a protected data field).

Overview

Provided herein are techniques for protected display of a requested user interface. The provided techniques enable secure and flexible display of user interfaces that contain sensitive information using masked user interfaces that are generated using data protection templates. The masked user interfaces may be generated and display when a user interface is requested while in a user-selected protection mode, but outside of the times when the system is in the protection mode unmasked/original user interfaces are generated and display using client devices. As such, users may seek assistance from third parties and/or users may also instruct third parties without risk of exposing his/her sensitive data. By providing techniques for protected display of user interfaces only in response to user selection of a protected mode, various embodiments of the present invention enable secure user interface presentation in a manner that is flexible and responsive to user selections, as user can select to turn off the user interface security measures by turning off the protection mode.

Additionally, in some embodiments, when protection mode is enabled (e.g., turned on), the actions performed by the user during are not executed and rather, the result of such actions are simply displayed via a user display on the client device. As such, users may perform actions to learn, teach, or otherwise showcase how to navigate and work an application, webpage, etc. without adverse consequences. For example, if a user wants to show a family member how to transfer funds but does not wish to transfer these funds, the user may enable protection mode and perform the actions as he/she would normally within a banking mobile application without displaying sensitive information and without initiating the actual transfer. Alternatively, when protection mode is enabled, these actions may be performed, and the results displayed without displaying sensitive information. An action performance determination may be determined based on user input, which may be requested when the user toggles on protection mode. For example, a client device may prompt a user as to whether they want to enter a training mode, which does not result in execution of actions selected while protection mode is enabled, via a training mode prompt. The user of the client device selects whether they want to enter training mode by performing a user selection action with the training mode prompt (e.g., selecting a "yes" button or "no" button" within the training mode prompt) that causes a training mode selection to describe an affirmative training mode value (e.g., when the "yes" button is selected) or a negative training mode value (e.g., when the "no" button is selected).

In some embodiments, to enable protected display of a requested user interface, the following operations are performed: receiving, using communication hardware, a protected mode display request to display the requested user interface in a protected mode, wherein the requested user interface comprises a plurality of data values each associated with a respective data field of a plurality of data fields; in response to the protected mode display request, using user interface generation circuitry: (i) retrieving a data protection template for the protected mode display request, wherein the data protection template defines one or more protected data fields of the plurality of data fields, (ii) determining, based on the data protection template, one or more protected data values of the plurality of data values and one or more unprotected data values of the plurality of data values, wherein: (a) each protected data value is associated with a respective protected data field of the one or more protected data fields and (b) each unprotected data value is associated with a respective unprotected data field of one or more unprotected data fields, (iii) for each protected data value, generating a masked representation, and (iv) generating a masked user interface that comprises: (a) each unprotected data value, and (b) each masked data value; and causing, using user interface generation circuitry, the masked user interface to be presented using a display device.

In some embodiments, a protected mode may be a mode of viewing/displaying a requested user interface that, when selected by a user of a client device, replaces some of the data values of the requested user interface with masked representations of those data values. In some embodiments, displaying a user interface in the protected mode comprises: (i) displaying one or more protected data values of the user interface using masked representations of the protected data values, and (ii) displaying one or more unprotected data values of the user interface using the original values of the one or more unprotected data values. In some embodiments, displaying a user interface in the protected mode enables the user to obtain assistance from a third party regarding how to interact with the user interface to perform a particular set of operations without revealing sensitive/confidential data values of the user interface to the third party. For example, if the user interface is part of an online banking platform provided by a financial institution to account holder users, then a particular account holder user can ask a third party (e.g., a bank representative) to view the user interface in the protected mode while teaching the account holder user about how to use the user interface to perform a particular task (e.g., to transfer money from one account to another account). In this example, while the user interface is being viewed in the protected mode, sensitive/confidential data values displayed by the user interface (e.g., account balance, recent transaction records, and/or the like) may be replaced with masked representations of those sensitive/confidential data values.

There are many technical advantages associated with the techniques provided herein for secure display of requested user interfaces. For example, various embodiments of the present invention enable a protection mode that, when enabled, causes user interfaces to be presented in a masked format and with the protected data values of those user interfaces replaced with masked representations. By enabling masked user interfaces that contain masked representations of protected data values instead of actual values of those protected data values, various embodiments of the present invention enhance data security of user interface platforms that are used to display sensitive data values.

As another example, when operations configured to generate masked user interfaces are performed on the server-side, a masked user interface that excludes protected data values may be transmitted to a client device, instead of transmitting a user interface that includes protected data values. By transmitting a masked user interface that excludes protected data values may be transmitted to a client device instead of a user interface that includes protected data values, various embodiments of the present invention enhance network transmission security and reliability of client-server networks that are used to transmit user interfaces from server devices to client devices.

As a further example, because a protected mode can be turned on and off by a user, the user can limit computationally expensive operations needed to generate masked user interfaces to those times when the user suspects and/or knows that there may be data security and/or network security threats (e.g., when the user is showing the user interface to a third party). By enabling the user to turn off protected mode and thus limit computationally expensive operations needed to generate masked user interfaces to those times when the user suspects and/or knows that there may be data security and/or network security threats, various embodiments of the present invention enhance computational efficiency of generating user interfaces that are configured to enhance data security and/or network security of user interface transmitted user interfaces. Additionally, in some embodiments when the client device is configured to receive the unmasked user interfaces from a server device, if a user turns off the protected mode, the client device may quickly and efficiently switch from presenting the masked user interface (e.g., generated by the client device) to the unmasked user interface without requesting this information from the server device, thereby conserving communication and computational bandwidth.

As described below, in some embodiments, operations configured to generate masked user interfaces are performed on the server side, while in other embodiments operations configured to generate masked user interfaces are performed on the client side.

In some embodiments, a server device is configured to receive protected display mode requests from client devices, generate masked user interfaces in response to the protected display mode requests, and provide the masked user interfaces to the client devices. Accordingly, in some of these embodiments, the operations configured to generate masked user interfaces are done on the server side, and the server device is thus a user interface generator that generates user interfaces that are masked in accordance with defined data protection guidelines.

In some embodiments, the server device is merely configured to generate and provide unmasked user interfaces to client devices. In response to receiving an unmasked user interface, a client device may be configured to generate a masked user interface and display the masked user interface to a display device of the client device. Accordingly, in some of these embodiments, the operations configured to generate masked user interfaces are done using the client device.

An operational example of various embodiments of the present invention relates to an advocacy mode is hosted at the application level. The advocacy mode can obfuscate sensitive information during presentation on a client device. In some cases, this can include allowing operations using fake data (e.g., showing someone how to perform a transaction in a banking app and displaying randomly-generated dollar values and transaction information rather than simply blurring or redacting that information).

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As depicted in FIG. 1, the environment includes a server device 101 and one or more client devices 102. Server device 101 and the one or more client devices 102 may receive and/or transmit information via communications network 108 (e.g., the Internet).

In some embodiments, the server device 101 is configured to receive protected display mode requests from client devices 102, generate masked user interfaces in response to the protected display mode requests, and provide the masked user interfaces to the client devices. Accordingly, in some of these embodiments, the operations configured to generate masked user interfaces are done on the server side, and the server device 101 is thus a user interface generator that generates user interfaces that are masked in accordance with defined data protection guidelines.

In some embodiments, the server device 101 is merely configured to generate and provide unmasked user interfaces to client devices 102. In response to receiving an unmasked user interface, a client device 102 may be configured to generate a masked user interface and display the masked user interface to a display device of the client device. Accordingly, in some of these embodiments, the operations configured to generate masked user interfaces are done on the client device.

The server device 101 may be configured to generate requested user interfaces and provide the requested user interfaces to client devices. The client device 102 may be configured to display user interfaces using the display device of the client device. The client device and the server device may be configured to communicate over the communications network 108.

Example Server Device

Figure 2:
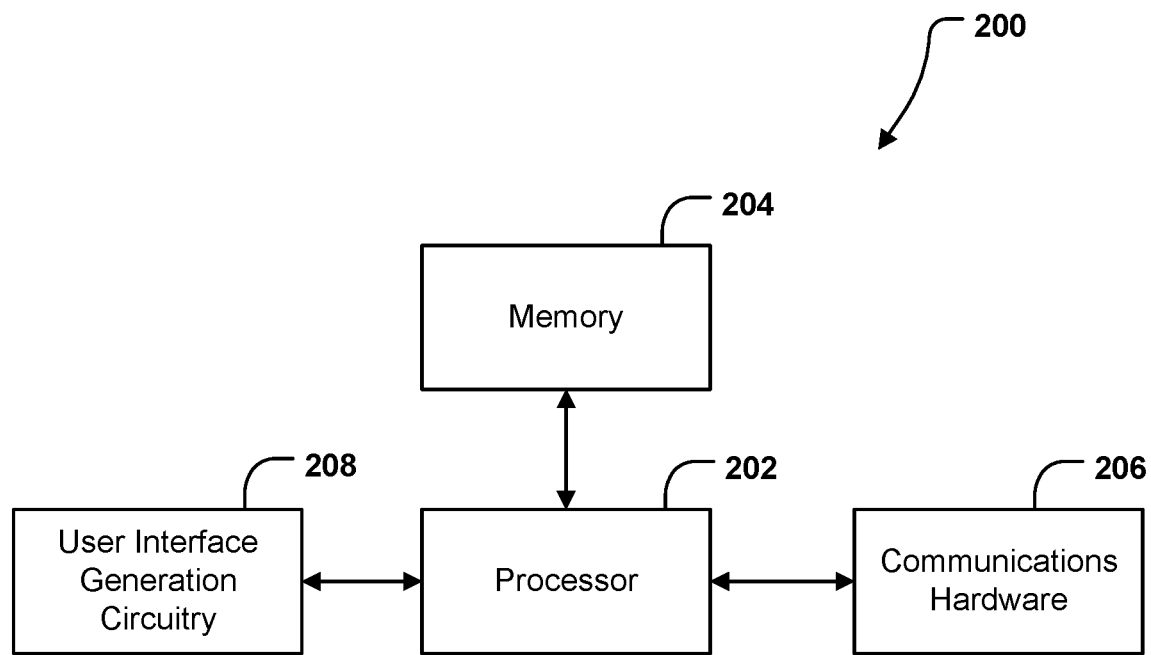
FIG. 2 illustrates a block diagram of example circuitry embodying a server device that may perform various operations in accordance with some example embodiments described herein.

The server device 101 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, and user interface generation circuitry 208, each of which will be described in greater detail below. While the various components are only illustrated in FIG. 2 as being connected with apparatus 200, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection FIGS. 4-9B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. The communications hardware 206 comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a user interface generation circuitry 208 that is configured to generate a user interface or a masked user interface. In some embodiments (e.g., in those embodiments in which masked user interfaces are generated using server-side operations), the user interface generation circuitry 208 is configured to generate masked user interfaces that are then provided to a client device using the communications hardware 206 for display by the client device. In some embodiments, (e.g., in those embodiments in which masked user interfaces are generated using client-side operations), the user interface generation circuitry 208 is configured to generate unmasked user interfaces that are then used by the client device to generate masked user interfaces, where the masked user interfaces are provided to a client device using the communications hardware 206.

Example Client Device

Figure 3:
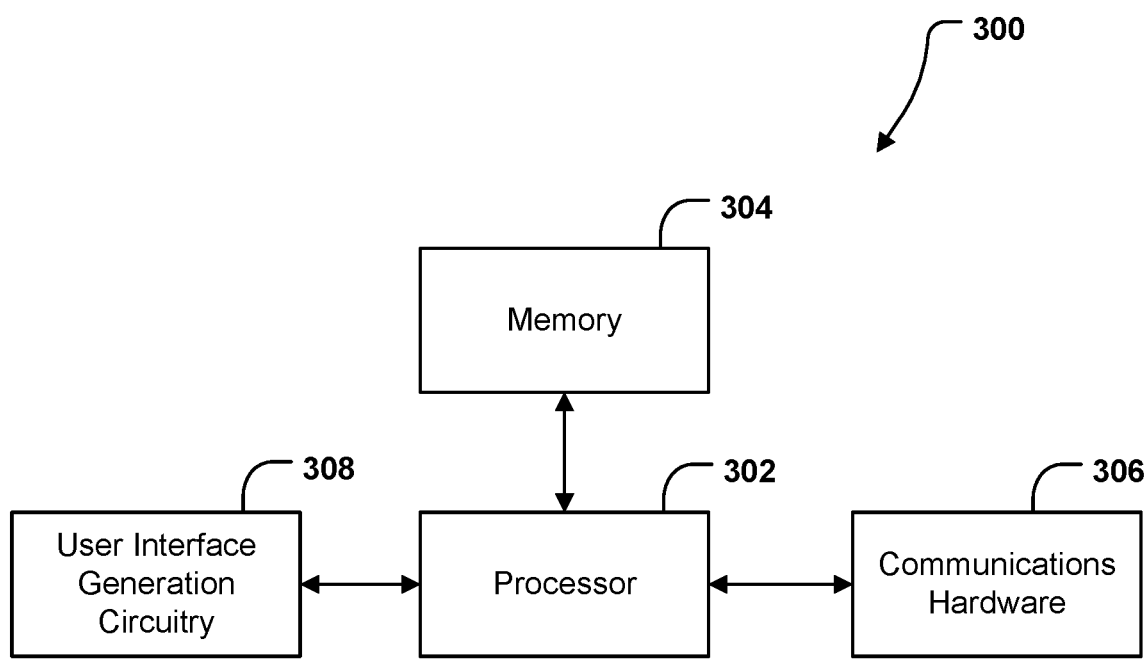
FIG. 3 illustrates a schematic block diagram of example circuitry embodying a client device that may perform various operations in accordance with some example embodiments described herein.

As illustrated in FIG. 3, an apparatus 300 is shown that represents a client device 102. As illustrated in FIG. 3, the apparatus 300 may include processor 302, memory 304, communications hardware 306, and user interface generation circuitry 308, each of which will be described in greater detail below. While the various components are only illustrated in FIG. 3 as being connected with apparatus 300, it will be understood that the apparatus 300 may further comprise a bus (not expressly shown in FIG. 3) for passing information amongst any combination of the various components of the apparatus 300. The apparatus 300 may be configured to execute various operations described above in connection with FIG. 1 and below in connection FIGS. 4-9B.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 302 represents an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

The memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processing circuitry for causing transmission of such signals to a network or for handling receipt of signals received from a network.

The communications hardware 306 may be configured to provide output to a user and, in some embodiments, to receive an indication of user input. The communications hardware 306 comprise a user interface, such as a display, and may further comprise the components that govern use of the user interface, such as a web browser, mobile application, dedicated client device, or the like. In some embodiments, the communications hardware 306 may include a keyboard, a mouse, a touch screen, touch areas, soft keys, a microphone, a speaker, and/or other input/output mechanisms. The communications hardware 306 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises a user interface generation circuitry 308 that is configured to either generate masked user interfaces and display those masked user interfaces, or alternatively to display masked user interfaces that are received from the server device. In some embodiments (e.g., in those embodiments in which masked user interfaces are generated using server-side operations), the user interface generation circuitry 308 is configured to receive a masked user interface from the server device and display the received user interface. In some embodiments, (e.g., in those embodiments in which masked user interfaces are generated using client-side operations), the user interface generation circuitry 308 is configured to receive an unmasked user interface from the server device, generate a masked user interface based on the unmasked user interface and a data protection template for the unmasked user interface, and then display the masked user interface.

In some embodiments, various components of the apparatus 200 and apparatus 300 may be hosted remotely (e.g., by one or more cloud servers) and thus need not physically reside on the corresponding apparatus 200 or apparatus 300. Thus, some or all of the functionality described herein may be provided by third party circuitry. For example, a given apparatus 200 or apparatus 300 may access one or more third party circuitries via any sort of networked connection that facilitates transmission of data and electronic information between the apparatus 200 or apparatus 300 and the third party circuitries. In turn, that apparatus 200 or apparatus 300 may be in remote communication with one or more of the other components described above as comprising the apparatus 200 or apparatus 300.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatus 200 and example apparatus 200, example embodiments are described below in connection with a series of diagrams and flowcharts.

Example Server-Side Operations

Figure 4:
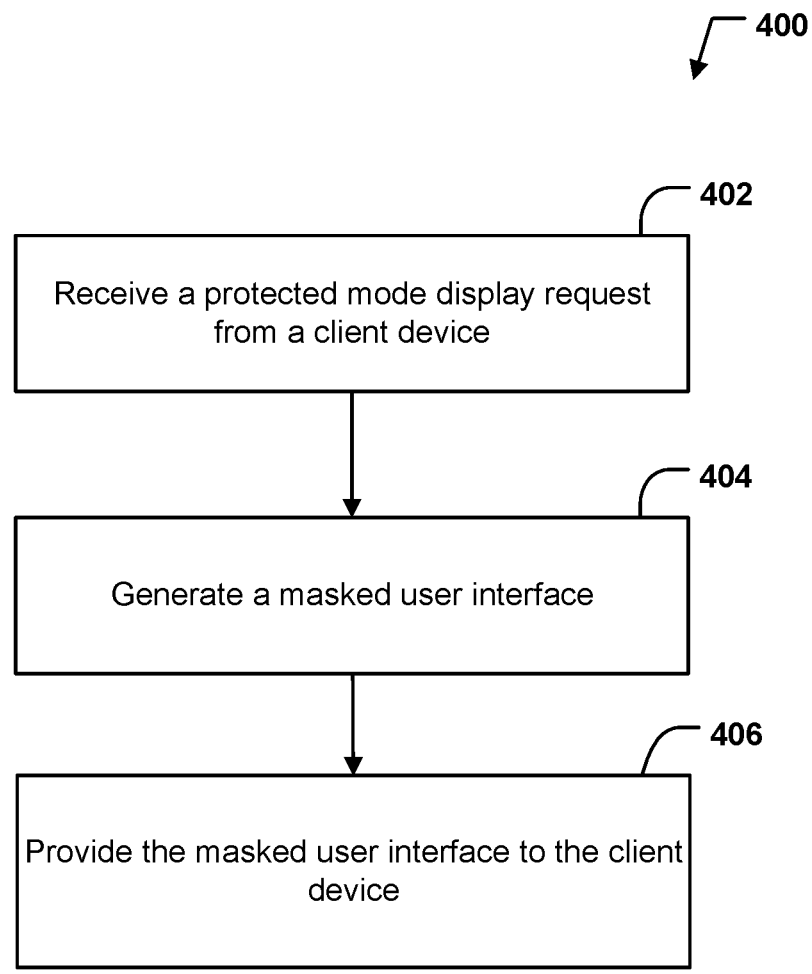
FIG. 4 illustrates an example flowchart for protected display of a requested user interface using server-side operations for generating masked user interfaces, in accordance with some example embodiments described herein.

Turning to FIG. 4, example flowcharts are illustrated that contain example operations implemented by example embodiments described herein. The operations illustrated in FIG. 4 may, for example, be performed by the server device, which may in turn be embodied by an apparatus 200, which is in turn described in connection with FIG. 2. To perform the operations described below, the apparatus 200 may utilize one or more of processor 202, memory 204, communications hardware 206, user interface generation circuitry 208, and/or any combination thereof. In particular, FIG. 4 depicts example operations 400 for generating a masked user interface by a server device 101 that is provided to a client device 102.

As shown in operation 402, the apparatus 200 includes means such as processor 202, memory 204, communications hardware 206, user interface generation circuitry 208, and/or any combination thereof for receiving a protected mode display request from a client device 102. In some embodiments, the communications hardware 206 receives the protected mode display request from the client device 102. The protected mode display request may be a request to view a requested user interface in a protected mode. In some embodiments, each user interface may be viewed in one of at least two display modes: in a protected mode, one or more protected data values of the user interface are masked, while in an unprotected mode none of the data values of the user interface are masked. In some embodiments, a protected mode display request is generated by a client device when a user of the client device requests to view a user interface while in the protected mode. For example, the user may request to display the user interface by clicking on a link and/or a button that is configured to indicate a request to display the request, where the clicking action is performed while a protected mode selection indicator describes an affirmative value (e.g., an "on" value).

Accordingly, a protected mode may be a mode of viewing/displaying a requested user interface that, when selected by a user of a client device, replaces some of the data values of the requested user interface with masked representations of those data values. In some embodiments, displaying a user interface in the protected mode comprises: (i) displaying one or more protected data values of the user interface using masked representations of the protected data values, and (ii) displaying one or more unprotected data values of the user interface using the original values of the one or more unprotected data values. In some embodiments, displaying a user interface in the protected mode enables the user to obtain assistance from a third party regarding how to interact with the user interface to perform a particular set of operations without revealing sensitive/confidential data values of the user interface to the third party. For example, if the user interface is part of an online banking platform provided by a financial institution to account holder users, then a particular account holder user can ask a third party (e.g., a bank representative) to view the user interface in the protected mode while teaching the account holder user about how to use the user interface to perform a particular task (e.g., to transfer money from one account to another account). In this example, while the user interface is being viewed in the protected mode, sensitive/confidential data values displayed by the user interface (e.g., account balance, recent transaction records, and/or the like) may be replaced with masked representations of those sensitive/confidential data values.

In some embodiments, a protected mode selection indicator describes a latest/current user selection about whether to enable the protected mode for viewing user interfaces. In some embodiments, a user of a client device selects a protected mode by performing a user selection action that causes a protected mode selection indicator to describe an affirmative indicator value (e.g., an "on" value). For example, in some embodiments, the user selection action comprises toggling a protected mode selection user interface element to an affirmative state (e.g., an "on" state). In some embodiments, after the user performs the user selection action while viewing a user interface, the user interface is displayed using the protected mode. In some embodiments, after the user performs the user selection action while viewing a user interface, the current user interface as well as all of the user interfaces that the user requests to view after viewing the current user interface are displayed in the protected mode until the user performs a user un-selection action that causes the protected mode selection indicator to describe a negative indicator value (e.g., an "off" value). For example, in some embodiments, the user un-selection action comprises toggling a protected mode selection user interface element to a negative state (e.g., an "off" state). Accordingly, in some embodiments, if a requested user interface is part of a sequence of requested user interfaces that the user has requested to display, the affirmative indicator value for the protected mode selection indicator is determined based on a user selection action that is performed while a first requested user interface in the sequence was being displayed to the user.

Figure 5A:
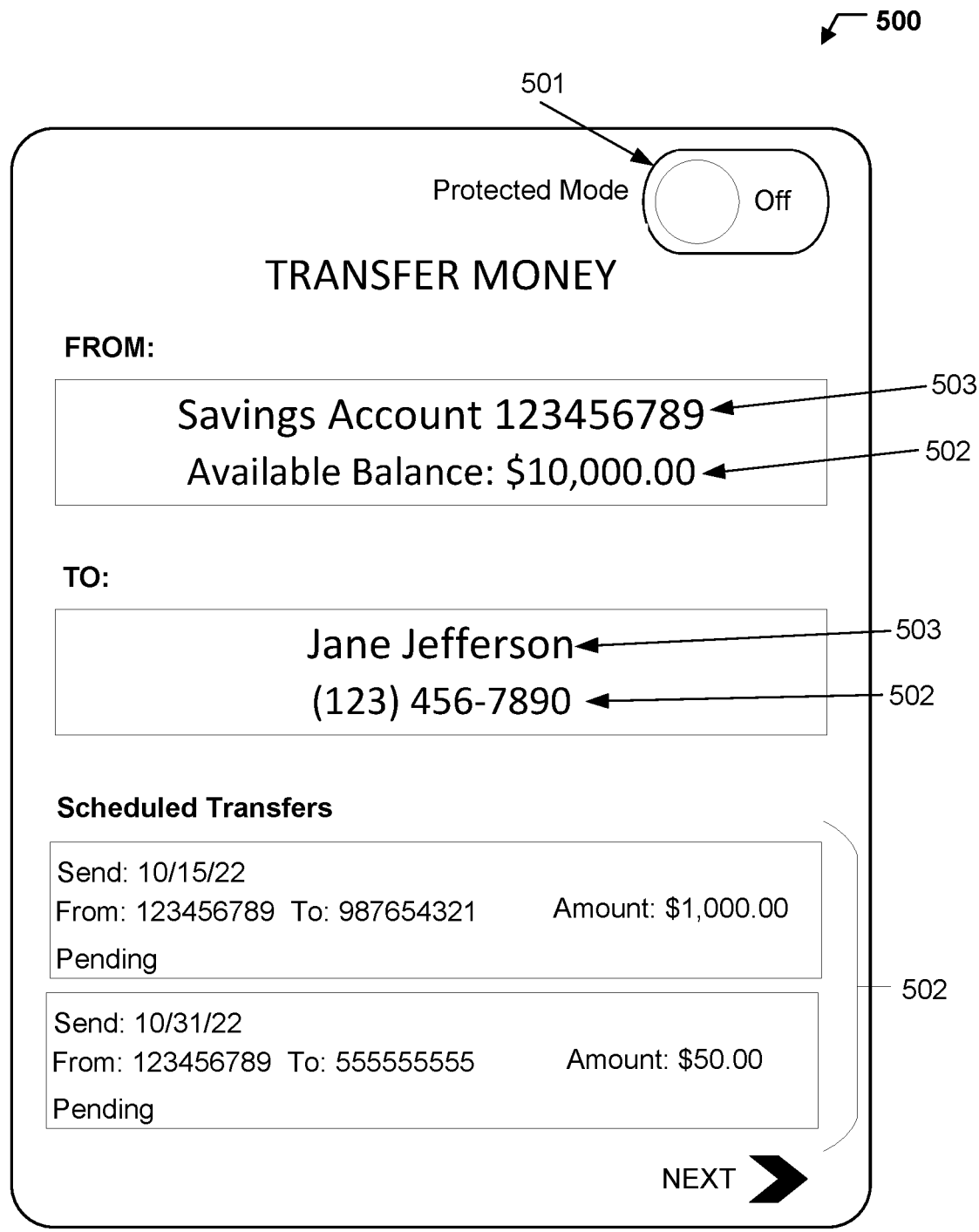
FIG. 5A provides an operational example of user operations that are configured to cause generating a protected mode display request, in accordance with some example embodiments described herein.
Figure 5B:
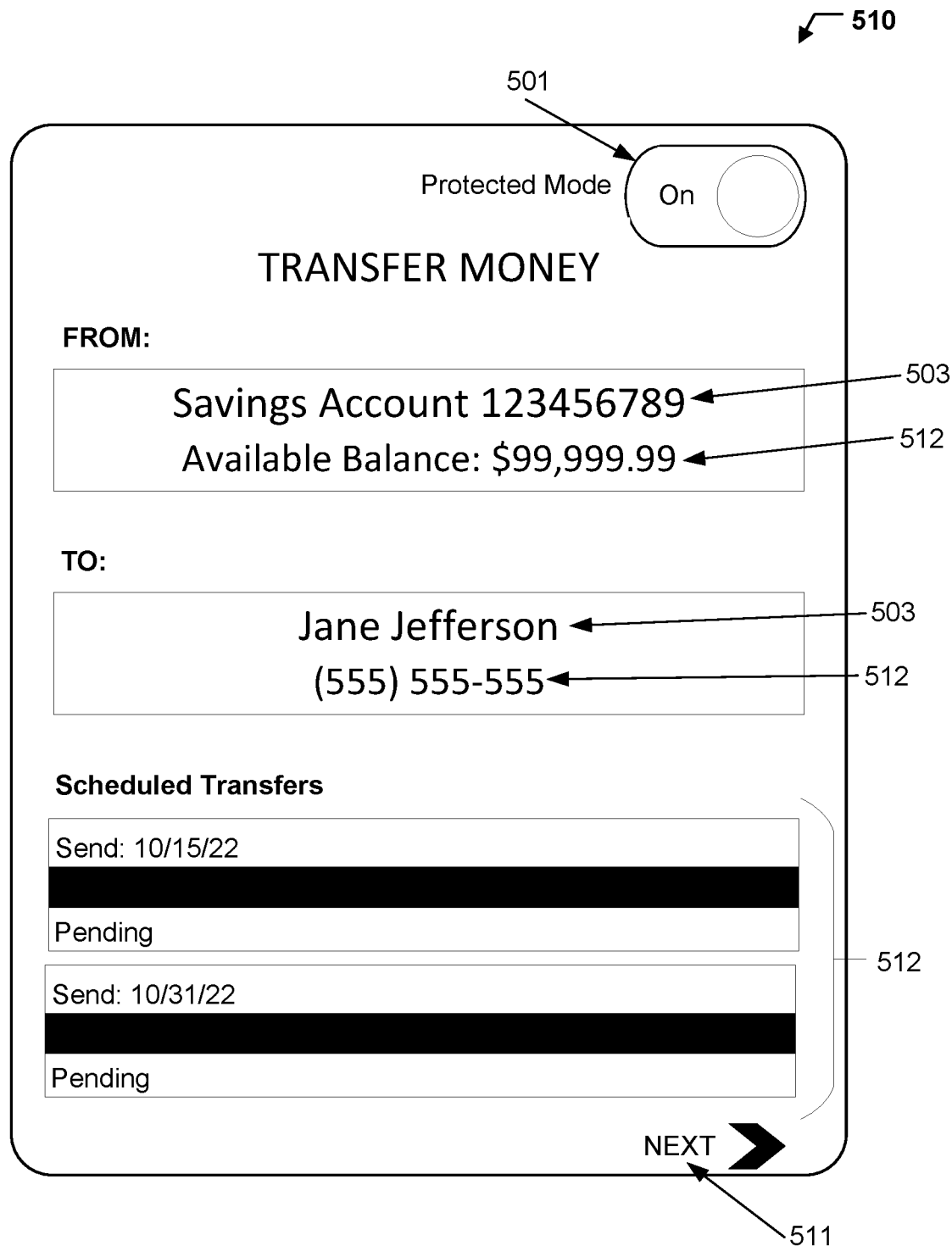
FIG. 5B provides an operational example of a masked user interface generated in response to a protected mode display request, in accordance with some example embodiments described herein.

An operational example of user actions that can cause a client device to generate a protected mode display request is depicted in FIG. 5A-5B. As depicted in FIG. 5A, the user interface 500 includes protected data values 502 corresponding to protected data fields and unprotected data values 503 corresponding to unprotected data fields. While viewing a user interface 500, the user may select the protected mode by toggling the protected mode selection user interface element 501 to an on/affirmative state. This user selection causes the client device to generate a first protected mode display request for viewing the user interface 500 in the protected mode.

In response to the first protected mode display request, the user interface 510 of FIG. 5B is generated and displayed to the user, where the user interface 510 is a masked user interface that is generated by replacing protected data values 502 of the user interface 500 with masked representations 512 for the protected data values 502. The particular masked representation 512 is dependent on the masked interface type associated with the data field of the protected data value. For example, the "available balance" data field type is associated with a synthetic masked representation type such that the original protected data values are replaced with synthetic data values. As another example, the "scheduled transfer from", "scheduled transfer to", and "scheduled transfer amount" data fields are redacted data fields, which are visually obfuscated from view. After the user interface 510 is displayed to the user, the user then selects a link 511 to a new user interface. This link selection action causes the client device to generate a second protected mode display request for viewing the new user interface in the protected mode.

In some embodiments, the protected mode display request further comprises an indication of whether a training mode decision, indicative of whether the user has requested to operate in a training mode. A training mode may allow the user to interact with his/her client device as they would normally and display results from those actions without actually performing the actions. As such, users may perform actions to learn, teach, or otherwise showcase how to navigate and work an application, webpage, etc. without adverse consequences. For example, if a user wants to show a family member how to transfer funds but does not wish to transfer these funds, the user may enable protection mode and perform the actions as he/she would normally within a banking mobile application without displaying sensitive information and without initiating the actual transfer. A client device may prompt a user as to whether they want to enter a training mode, which does not result in execution of actions selected while protection mode is enable, via a training mode prompt. The user of the client device selects whether they want to enter training mode by performing a user selection action via interaction with the training mode prompt (e.g., selecting a "yes" button or "no" button" within the training mode prompt) that causes a training mode selection to describe an affirmative training mode value (e.g., when the "yes" button is selected) or a negative training mode value (e.g., when the "no" button is selected). The apparatus 200 may then determine to enable training mode when an affirmative training mode value is received or not enable training mode when a negative training mode value is received in the protected mode display request.

Figure 6:
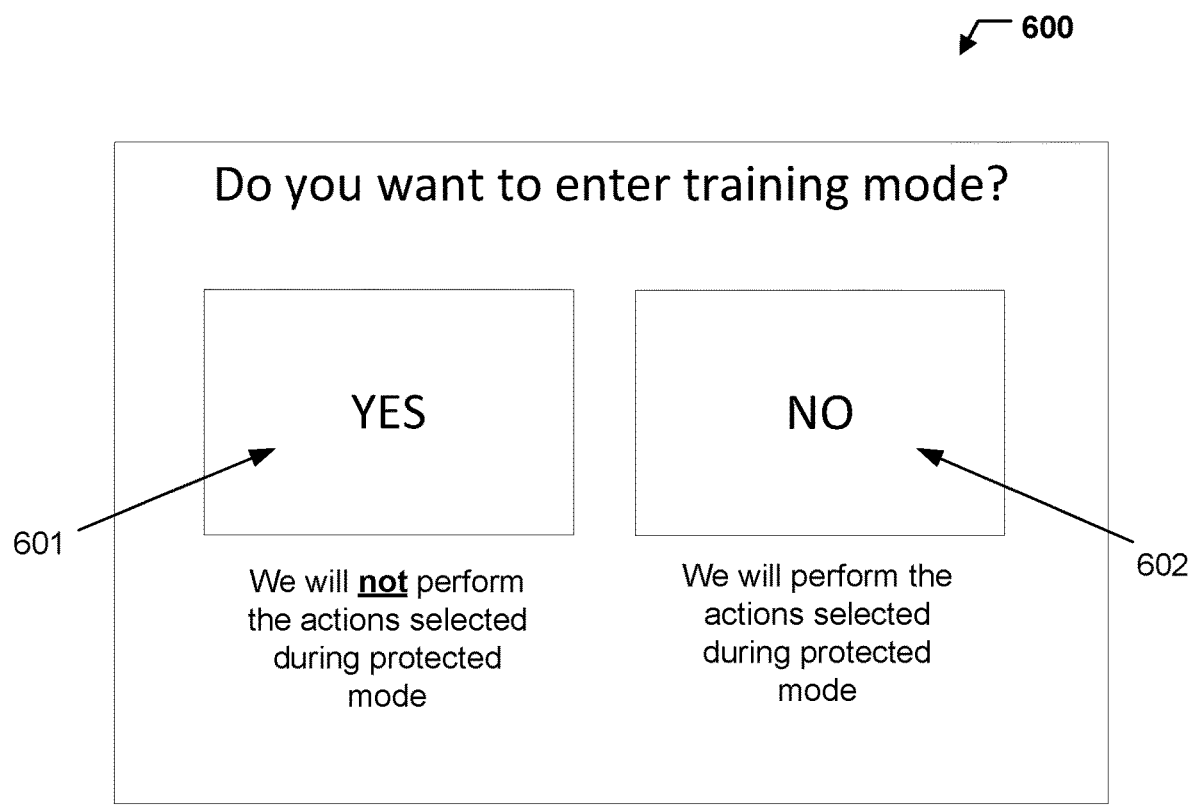
FIG. 6 provides an operational example of a training mode prompt generated in response to receipt of an affirmative value for a protected mode selection indicator, in accordance with some example embodiments described herein.

An operational example of a training mode prompt 600 is depicted in FIG. 6. As depicted in FIG. 6, the training mode prompt 600 includes a training mode affirmative option 601 which may be selectable by the user (e.g., by touching, clicking, or otherwise interacting with the training mode affirmative option) to enter an affirmative training mode value. The training mode prompt 600 also includes a training mode negative option 602 which also selectable by the user (e.g., by touching, clicking, or otherwise interacting with the training mode affirmative option) to enter a negative training mode value. This user selection causes the apparatus 200 to determine whether to enable training mode such that it will not perform any actions received from client device 102.

As shown in operation 404, the apparatus 200 includes means such as processor 202, memory 204, communications hardware 206, user interface generation circuitry 208, and/or any combination thereof for generating a masked user interface. In some embodiments, the user interface generation circuitry 208 generates the masked user interface by replacing protected data values of the requested user interface with masked representations of those protected data values.

In some embodiments, a masked user interface describes a set of user interface elements that are configured to depict protected data values of a requested user interface using masked representations of those protected data values. In some embodiments, to generate a masked user interface for a requested user interface, the following operations are performed: (i) identifying a data protection template that can be used to determine one or more protected data values of the requested user interface and one or more unprotected data values of the requested user interface, (ii) for each protected data value, generating a masked representation that does not describe the protected data value, and (iii) generating the masked user interface to comprise each unprotected data value and each masked representation. In some embodiments, in a masked user interface that is generated based on a requested user interface, the arrangement of user interface elements corresponding to the unprotected data values and the arrangement of user interface elements corresponding to the masked representations is determined based on the arrangement of the unprotected data values and the arrangement of the protected data values in the requested user interface. In some of the noted embodiments, a masked user interface for a requested user interface is a user interface that comprises all of the user interface elements of the requested user interface in accordance with the display arrangement of those user interface elements except that, in the masked user interface, the protected data values of the requested user interface element are replaced with masked representations of those protected data values.

As described above, a masked user interface for a requested user interface may be generated based on a data protection template for the requested user interface. In some embodiments, the data protection template for a user interface describes which of the data values depicted by the user interface are designated as being protected data values. In some embodiments, a data protection template for a requested user interface can be used to determine one or more protected data fields of the requested user interface. In some of the noted embodiments, each protected data value is associated with a respective protected data field of the one or more protected data fields, each unprotected data value is associated with a respective unprotected data field of one or more unprotected data fields, and the one or more unprotected data fields comprise each data field whose data value is depicted by the requested user interface and falls outside the one or more protected data fields. The data protection template may describe the one or more protected data fields as well as a masked representation type for each protected data field. For example, a protected data field may describe a redacted masked representation type, such that protected data field values corresponding to this protected data field will be blurred when displayed via a user interface. In some embodiments, the data protection template may also describe the one or more unprotected data field types. Alternatively, data field types not described by the data protection template may be determined to be unprotected data field types. In some of the noted embodiments, each protected data value of a protected mode display request is associated with a respective protected data field of the one or more protected data fields, each unprotected data value of a protected mode display request is associated with a respective unprotected data field of one or more unprotected data fields, and the one or more unprotected data fields comprise each data field whose data value is depicted by the requested user interface and falls outside the one or more protected data fields.

In some embodiments, a protected data value is a data value that is depicted by a user interface and is associated with a protected data field of the user interface as described by the data protection template for the user interface. In some embodiments, each user interface is configured to depict a set of data values for a set of data fields, where each data value is the value depicted by the user interface for a respective data field. For example, an account information user interface may be configured to depict an account balance data value for an account balance data field and an account number data value for an account number data field.

In some embodiments, given a user interface that is configured to depict data values for a set of data fields, the data protection template for the given user interface may describe which of the data fields in the set of data fields are designated as being protected data fields and which of the data fields in the set of data fields are designated as being unprotected data fields. For example, given an account information user interface that is configured to depict an account balance data value for an account balance data field and an account number data value for an account number data field, the data protection template for the given account information user interface may describe that the account balance data field is a protected data field while the account number data field is an unprotected data field.

In some embodiments, when a data value is associated with a protected data field, the data value is designated as being a protected data value, while a data value that is associated with an unprotected data field is designated as being an unprotected data value. For example, when the data protection template for an account information user interface may describe that the account balance data field is a protected data field while the account number data field is an unprotected data field, then the account balance data value that is depicted by the account information user interface may be designated as being a protected data value, while the account number data value that is depicted by the account information user interface may be designated as being an unprotected data value.

Figure 7:
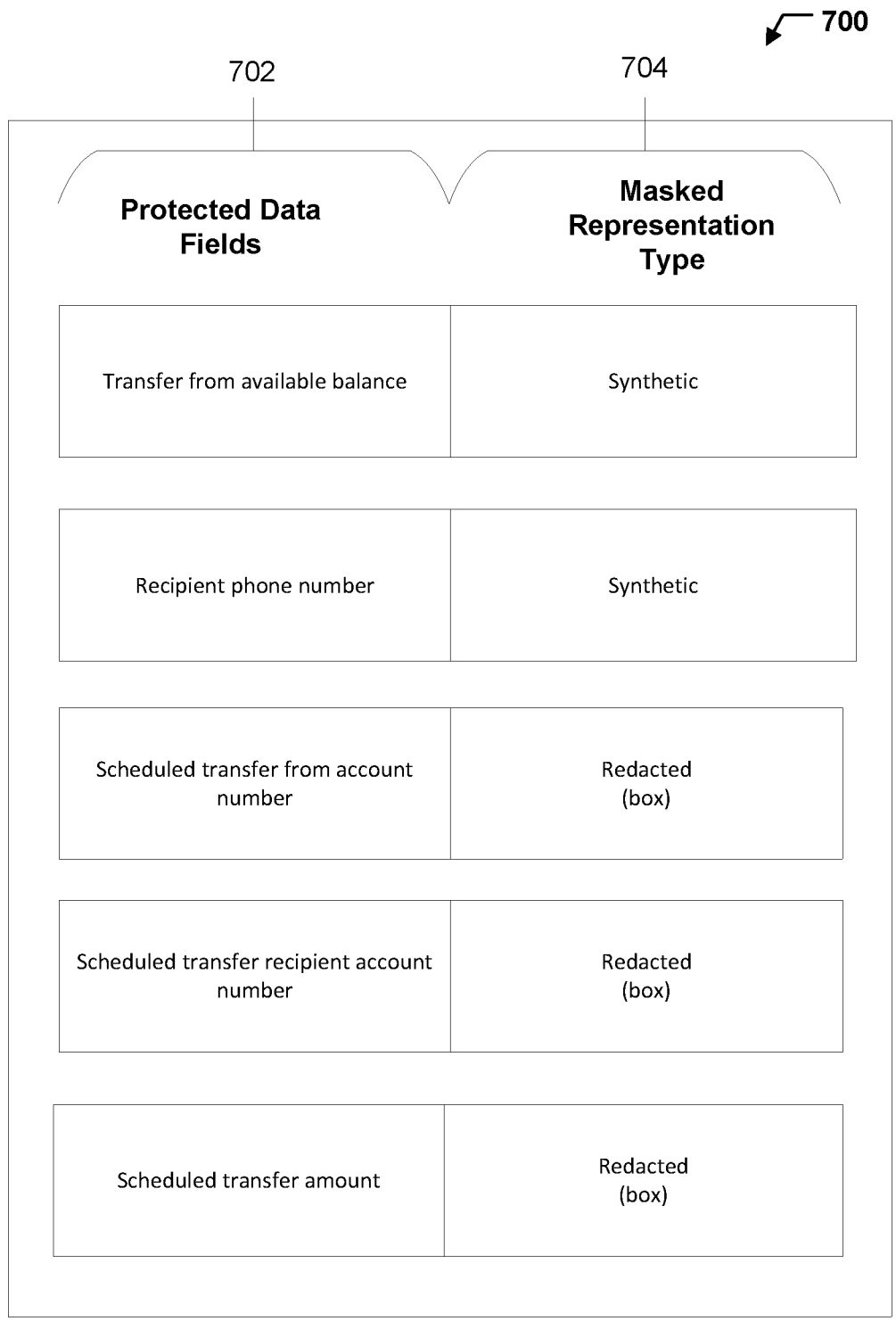
FIG. 7 provides an operational example of a data protection template for a user interface, in accordance with some example embodiments described herein.

An operational example of a data protection template 700 for the user interface 500 of FIG. 5A is depicted in FIG. 7. As depicted in FIG. 7, the data protection template 700 describes one or more protected data fields of the user interface 500, including the protected data fields 702 that is associated with the protected data values 502 of the user interface 500. Accordingly, each data field whose data value is described by the user interface 500 but is not described by the data protection template 700 is an unprotected data field.

For example, the transfer from number data field of the user interface 500 shown in FIG. 5A is an unprotected data field because it is not listed by the data protection template 700, even though it is associated with the savings account value of the user interface 500, which by contrast is an unprotected data value. Additionally, each protected data field is associated with a masked representation type 704. As described above, a masked representation type may be a redacted masked representation type or a synthetic masked representation type. For example, a masked representation corresponding to a redacted masked representation type for a respective protected data value comprises a mask user interface element, such a mask user interface element that depicts the user interface region associated with the respective protected value as a redacted region. A mask user interface element may visually obfuscate the protected data value, such as by blurring or overlaying a mask (e.g., a darkened box) over the protected data value. As another example, a masked representation corresponding to a synthetic masked representation type for a respective protected data value comprises a masked data value that is different from the respective protected data value. For example, the protected data value may be replaced by a randomly generated value.

As further described above, a masked user interface is generated by replacing protected data values of a requested user interface with masked representations. In some embodiments, the masked representation for a respective protected data value comprises a mask user interface element, such a mask user interface element that depicts the user interface region associated with the respective protected value as a redacted region. In some embodiments, the masked representation for a respective protected data value comprises a masked data value that is different from the respective protected data value. In some embodiments, the masked data value is a randomly-generated data value. In some embodiments, the randomly-generated data value is determined based on a probability distribution whose parameters (e.g., whose mean and/or standard deviation) are determined based on the respective protected data value. In some embodiments, the masked data value is determined based on one or more other data values (e.g., unprotected data values, protected data values, and/or masked data values). For example, a masked data value of $1000.00 for a user account balance data field type (e.g., a protected data field) and an unprotected data value of $600.00 for a withdrawal amount data field type (e.g., an unprotected data field) may be used to generate a masked data value of $400.00 for a remaining balance data field type (e.g., a protected data field).

As shown in operation 406, the apparatus 200 includes means such as processor 202, memory 204, communications hardware 206, user interface generation circuitry 208, and/or any combination thereof for providing the masked user interface to a client device. In some embodiments, the communications hardware provides data describing the masked user interface to the client device, which is then configured to display the masked user interface to an end user of the client device, such as client device 102. In some embodiments, the masked user interface includes one or more instructions configured to cause the masked user interface to render on the client device 102. In some embodiments, the client device 102 may use a display device, such as a screen of the client device 102 or one or more connected monitors to display the masked user interface. As such, the associated user and any third parties are presented with a user interface that protects the sensitive data of the user while still allowing for normal operation and navigation of an associated application, website, etc.

Example Client-Side Operations

Figure 8:
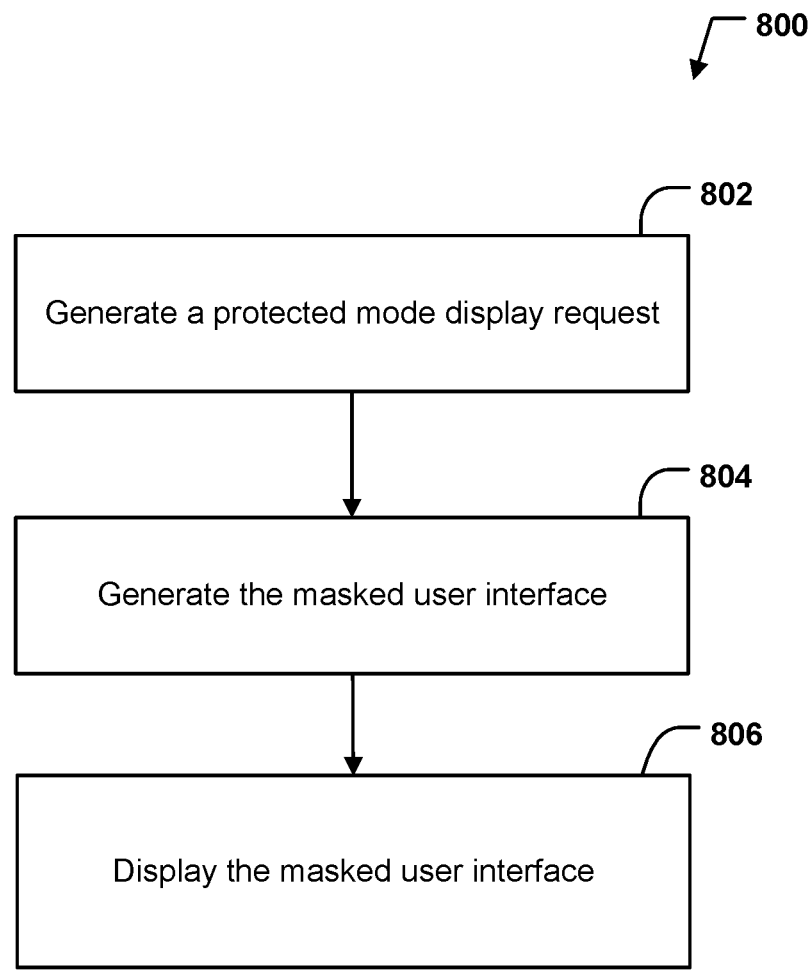
FIG. 8 illustrates an example flowchart for protected display of a requested user interface using client-side operations for generating masked user interfaces, in accordance with some example embodiments described herein.

Turning to FIG. 8, example flowcharts are illustrated that contain example operations implemented by example embodiments described herein. The operations illustrated in FIG. 8 may, for example, be performed by a client device, which may in turn be embodied by an apparatus 300, which is in turn described in connection with FIG. 3. To perform the operations described below, the apparatus 300 may utilize one or more of processor 302, memory 304, communications hardware 306, user interface generation circuitry 308, and/or any combination thereof. In particular, FIG. 7 depicts example operations 800 for generating a masked user interface by a server device 101 that is provided to a client device 102.

As shown in operation 802, the apparatus 300 includes means such as processor 302, memory 304, communications hardware 306, user interface generation circuitry 308, and/or any combination thereof for generating a protected mode display request from a client device 102. In some embodiments, the user interface generation circuitry 308 generates the protected mode display request when it detects at last one of the following: (i) that the user of the client device has selected to switch to a protected mode, or (ii) that the user of the client device has selected to view a new user interface while in the protected mode.

The protected mode display request may be a request to view a requested user interface in a protected mode. In some embodiments, each user interface may be viewed in one of at least two display modes: in a protected mode, one or more protected data values of the user interface are masked, while in an unprotected mode none of the data values of the user interface are masked. In some embodiments, a protected mode display request is generated by a client device when a user of the client device requests to view a user interface while in the protected mode. For example, the user may request to display the user interface by clicking on a link and/or a button that is configured to indicate a request to display the request, where the clicking action is performed while a protected mode selection indicator describes an affirmative value (e.g., an "on" value).

Accordingly, a protected mode may be a mode of viewing/displaying a requested user interface that, when selected by a user of a client device, replaces some of the data values of the requested user interface with masked representations of those data values. In some embodiments, displaying a user interface in the protected mode comprises: (i) displaying one or more protected data values of the user interface using masked representations of the protected data values, and (ii) displaying one or more unprotected data values of the user interface using the original values of the one or more unprotected data values.

In some embodiments, displaying a user interface in the protected mode enables the user to obtain assistance from a third party regarding how to interact with the user interface to perform a particular set of operations without revealing sensitive/confidential data values of the user interface to the third party. For example, if the user interface is part of an online banking platform provided by a financial institution to account holder users, then a particular account holder user can ask a third party (e.g., a bank representative) to view the user interface in the protected mode while teaching the account holder user about how to use the user interface to perform a particular task (e.g., to transfer money from one account to another account). In this example, while the user interface is being viewed in the protected mode, sensitive/confidential data values displayed by the user interface (e.g., account balance, recent transaction records, and/or the like) may be replaced with masked representations of those sensitive/confidential data values.

In some embodiments, a protected mode selection indicator describes a latest/current user selection about whether to enable the protected mode for viewing user interfaces. In some embodiments, a user of a client device selects a protected mode by performing a user selection action that causes a protected mode selection indicator to describe an affirmative indicator value (e.g., an "on" value). For example, in some embodiments, the user selection action comprises toggling a protected mode selection user interface element to an affirmative state (e.g., an "on" state). In some embodiments, after the user performs the user selection action while viewing a user interface, the user interface is displayed using the protected mode. In some embodiments, after the user performs the user selection action while viewing a user interface, the current user interface as well as all of the user interfaces that the user requests to view after viewing the current user interface are displayed in the protected mode until the user performs a user un-selection action that causes the protected mode selection indicator to describe a negative indicator value (e.g., an "off" value). For example, in some embodiments, the user un-selection action comprises toggling a protected mode selection user interface element to a negative state (e.g., an "off" state). Accordingly, in some embodiments, if a requested user interface is part of a sequence of requested user interfaces that the user has requested to display, the affirmative indicator value for the protected mode selection indicator is determined based on a user selection action that is performed while a first requested user interface in the sequence was being displayed to the user.

As shown in operation 804, the apparatus 300 includes means such as processor 302, memory 304, communications hardware 306, user interface generation circuitry 308, and/or any combination thereof for generating a masked user interface. In some embodiments, the user interface generation circuitry 308 generates the masked user interface by replacing protected data values of the requested user interface with masked representations of those protected data values.

In some embodiments, a masked user interface describes a set of user interface elements that are configured to depict protected data values of a requested user interface using masked representations of those protected data values. In some embodiments, to generate a masked user interface for a requested user interface, the following operations are performed: (i) identifying a data protection template that can be used to determine one or more protected data values of the requested user interface and one or more unprotected data values of the requested user interface, (ii) for each protected data value, generating a masked representation that does not describe the protected data value, and (iii) generating the masked user interface to comprise each unprotected data value and each masked representation. In some embodiments, in a masked user interface that is generated based on a requested user interface, the arrangement of user interface elements corresponding to the unprotected data values and the arrangement of user interface elements corresponding to the masked representations is determined based on the arrangement of the unprotected data values and the arrangement of the protected data values in the requested user interface. In some of the noted embodiments, a masked user interface for a requested user interface is a user interface that comprises all of the user interface elements of the requested user interface in accordance with the display arrangement of those user interface elements except that, in the masked user interface, the protected data values of the requested user interface element are replaced with masked representations of those protected data values.

As described above, a masked user interface for a requested user interface may be generated based on a data protection template for the requested user interface. In some embodiments, the data protection template for a user interface describes which of the data values depicted by the user interface are designated as being protected data values. In some embodiments, a data protection template for a requested user interface can be used to determine one or more protected data fields of the requested user interface. In some of the noted embodiments, each protected data value is associated with a respective protected data field of the one or more protected data fields, each unprotected data value is associated with a respective unprotected data field of one or more unprotected data fields, and the one or more unprotected data fields comprise each data field whose data value is depicted by the requested user interface and falls outside the one or more protected data fields. The data protection template may describe the one or more protected data fields as well as a masked representation type for each protected data field. For example, a protected data field may describe a redacted masked representation type, such that protected data field values corresponding to this protected data field will be blurred when displayed via a user interface. In some embodiments, the data protection template may also describe the one or more unprotected data field types. Alternatively, data field types not described by the data protection template may be determined to be unprotected data field types. In some of the noted embodiments, each protected data value of a protected mode display request is associated with a respective protected data field of the one or more protected data fields, each unprotected data value of a protected mode display request is associated with a respective unprotected data field of one or more unprotected data fields, and the one or more unprotected data fields comprise each data field whose data value is depicted by the requested user interface and falls outside the one or more protected data fields.

In some embodiments, a protected data value is a data value that is depicted by a user interface and is associated with a protected data field of the user interface as described by the data protection template for the user interface. In some embodiments, each user interface is configured to depict a set of data values for a set of data fields, where each data value is the value depicted by the user interface for a respective data field. For example, an account information user interface may be configured to depict an account balance data value for an account balance data field and an account number data value for an account number data field. In some embodiments, given a user interface that is configured to depict data values for a set of data fields, the data protection template for the given user interface may describe which of the data fields in the set of data fields are designated as being protected data fields and which of the data fields in the set of data fields are designated as being unprotected data fields. For example, given an account information user interface that is configured to depict an account balance data value for an account balance data field and an account number data value for an account number data field, the data protection template for the given account information user interface may describe that the account balance data field is a protected data field while the account number data field is an unprotected data field. In some embodiments, when a data value is associated with a protected data field, the data value is designated as being a protected data value, while a data value that is associated with an unprotected data field is designated as being an unprotected data value. For example, when the data protection template for an account information user interface may describe that the account balance data field is a protected data field while the account number data field is an unprotected data field, then the account balance data value that is depicted by the account information user interface may be designated as being a protected data value, while the account number data value that is depicted by the account information user interface may be designated as being an unprotected data value.

As further described above, a masked user interface is generated by replacing protected data values of a requested user interface with masked representations. In some embodiments, the masked representation for a respective protected data value comprises a mask user interface element, such a mask user interface element that depicts the user interface region associated with the respective protected value as a redacted region. In some embodiments, the masked representation for a respective protected data value comprises a masked data value that is different from the respective protected data value. In some embodiments, the masked data value is a randomly-generated data value. In some embodiments, the randomly-generated data value is determined based on a probability distribution whose parameters (e.g., whose mean and/or standard deviation) are determined based on the respective protected data value.

As shown in operation 806, the apparatus 300 includes means such as processor 302, memory 304, communications hardware 306, user interface generation circuitry 308, and/or any combination thereof for displaying the masked user interface. In some embodiments, the user interface generation circuitry 308 displays the masked user interface to a user of the apparatus via a display device that is connected to the apparatus. In some embodiments, the display device is an associated user interface of the apparatus 300, such as a screen of the apparatus 300 or one or more connected monitors. As such, the associated user and any third parties are presented with a user interface that protects the sensitive data of the user while still allowing for normal operation and navigation of an associated application, website, etc.

Example Operations

Figure 9B:
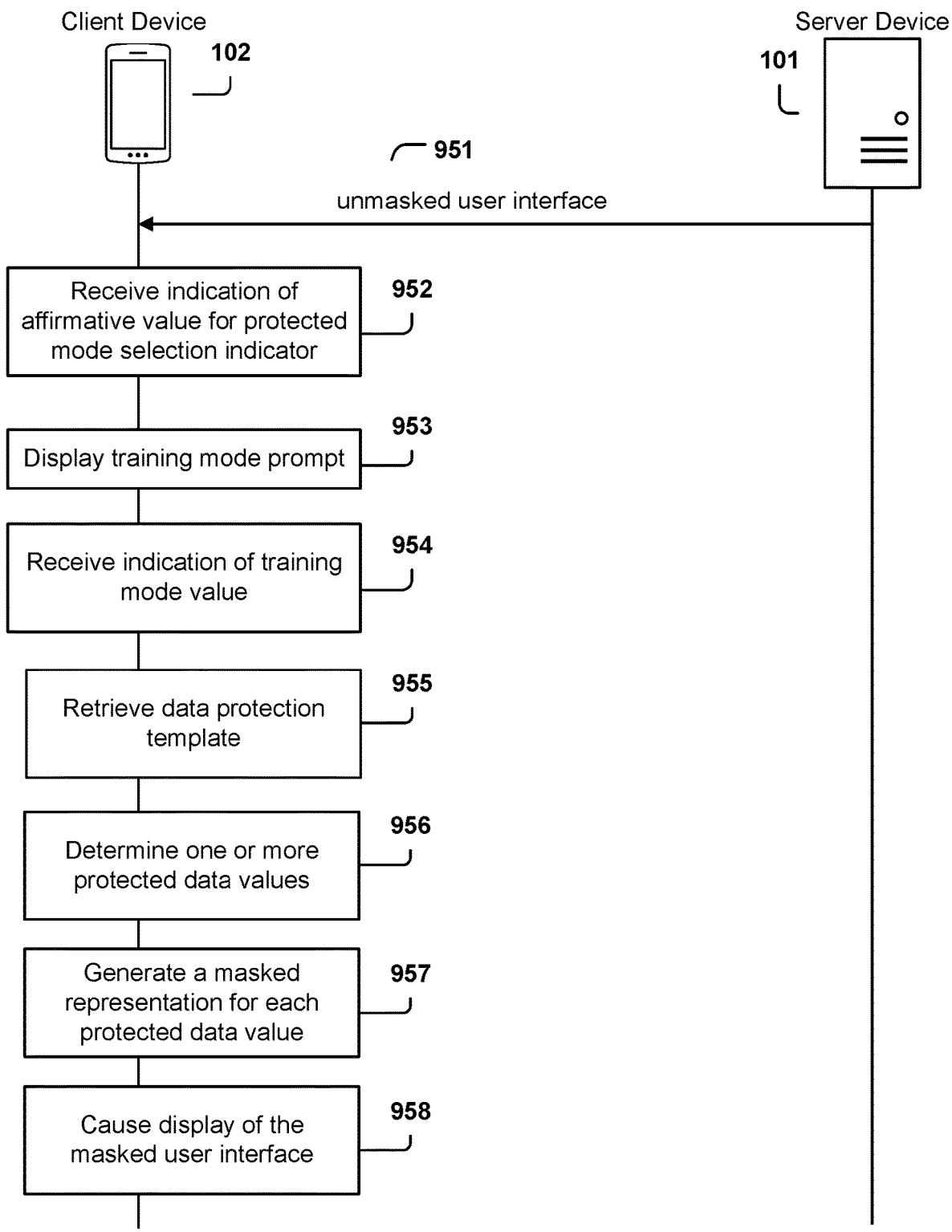
FIG. 9B illustrates a swim lane diagram of operations for protected display of a requested user interface using client device side operations, in accordance with some example embodiments described herein.

FIGS. 9A-9B show swim lane diagrams illustrating example operations (e.g., as described above in connection with FIGS. 4-8) performed by components of the environment depicted in FIG. 1 to produce various benefits from example embodiments. In these figures, operations performed by a server device 101 are shown along the vertical line extending from the element labeled "server device," operations performed by a client device 102 are shown along the vertical line extending from the element labeled "client device." Operations impacting both devices, such as data transmissions between the devices, are shown using arrows extending between these lines. Generally, the operations are ordered temporally with respect to one another. However, it will be appreciated that the operations may be performed in other orders from those illustrated herein.

FIG. 9A depicts example operations for example embodiments where a server device 101 generates masked user interfaces and provides the masked user interfaces to the client device 102. At operation 901, the client device 102 may receive an indication of an affirmative value for a protected mode selection indicator, such as by a user toggling a protected mode selection indictor to an "on" position. At operation 902, the client device 102 may display a training mode prompt to the user. At operation 903, the client device 102 may receive an indication of a training mode value (e.g., affirmative or negative depending on user input). At operation 904, the client device 102 may provide a protected mode display request, which may include the training mode value, to the server device 101. At operation 905, the server device 101 may retrieve a data protection template. At operation 906, the server device 101 may determine one or more protected data values. At operation 907, the server device 101 may generate a masked representation for each protected data value. At operation 908, the server device 101 may provide the masked user interface, which includes the masked representations for the protected data values and the unprotected data values, to the client device 102. At operation 909, the client device 102 may cause display of the masked user interface via an associated client device user interface.

Alternatively, FIG. 9B depicts example operations for example embodiments where a client device 102 generates the masked user interfaces. At operation 951, the client device 102 may receive unmasked user interfaces from a server device 101. At operation 952, the client device 102 may receive an indication of an affirmative value for a protected mode selection indicator, such as by a user toggling a protected mode selection indictor to an "on" position. At operation 953, the client device 102 may display a training mode prompt to the user. At operation 954, the client device 102 may receive an indication of a training mode value (e.g., affirmative or negative depending on user input). At operation 955, the client device 102 may retrieve a data protection template. At operation 956, the client device 102 may determine one or more protected data values. At operation 957, the client device 102 may generate a masked representation for each protected data value. At operation 958, the client device 102 may cause display of the masked user interface via an associated client device user interface.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for protected mode display of a requested user interface, the method comprising:
receiving, using communication hardware, a protected mode display request to display the requested user interface in a protected mode, wherein the requested user interface comprises a plurality of data values each associated with a respective data field of a plurality of data fields; and in response to the protected mode display request:
retrieving, using user interface generation circuitry, a data protection template for the protected mode display request, wherein the data protection template defines one or more protected data fields of the plurality of data fields, determining, using the user interface generation circuitry and based on the data protection template, one or more protected data values of the plurality of data values and one or more unprotected data values of the plurality of data values, wherein: (i) each protected data value is associated with a respective protected data field of the one or more protected data fields and (ii) each unprotected data value is associated with a respective unprotected data field of one or more unprotected data fields, for each protected data value, generating, using the user interface generation circuitry, a masked representation, generating, using the user interface generation circuitry, a masked user interface that comprises: (i) each unprotected data value, and (ii) each masked representation, and causing, using the user interface generation circuitry, the masked user interface to be presented using a display device.

2. The method of claim 1, wherein the protected mode display request is generated in response to receiving a request to display the requested user interface and determining a protected mode selection indicator describes an affirmative indicator value.

3. The method of claim 2, wherein:
the requested user interface is part of a sequence of requested user interfaces that a user has requested to display, and
the affirmative indicator value is determined based on a user selection action that is performed while a first requested user interface in the sequence of requested user interfaces is being displayed to the user.

4. The method of claim 3, wherein the user selection action comprises toggling a protected mode selection user interface element to an affirmative state.

5. The method of claim 1, wherein the masked representation for a respective protected data value comprises a mask user interface element.

6. The method of claim 1, wherein the masked representation for a respective protected data value comprises a masked data value that is different from the respective protected data value.

7. The method of claim 6, wherein the masked data value is a randomly-generated data value.

8. The method of claim 7, wherein the randomly-generated data value is determined based on a probability distribution whose parameters are determined based on the respective protected data value.

9. The method of claim 1, wherein generating the masked representation for a respective protected data value further comprises one or more of (i) blurring the respective protected data value or (ii) overlaying a mask element over the respective protected data value to visually obfuscate the respective protected data value.

10. The method of claim 1, wherein the one or more unprotected data fields comprise each data field of the plurality of data fields that falls outside the one or more protected data fields described in the data protection template.

11. The method of claim 1, wherein:
the method is being performed by a server device, and
causing the masked user interface to be presented comprises providing the masked user interface to a client device.

12. The method of claim 1, wherein:
the method is being performed by a client device, and
causing the masked user interface to be presented comprises displaying the masked user interface.

13. An apparatus for protected mode display of a requested user interface, the apparatus comprising:
communications hardware configured to:
receive a protected mode display request to display the requested user interface in a protected mode, wherein the requested user interface comprises a plurality of data values each associated with a respective data field of a plurality of data fields, and
user interface generation circuitry configured to, in response to the protected mode display request:
retrieve a data protection template for the protected mode display request, wherein the data protection template defines one or more protected data fields of the plurality of data fields;
determine, based on the data protection template, one or more protected data values of the plurality of data values and one or more unprotected data values of the plurality of data values, wherein: (i) each protected data value is associated with a respective protected data field of the one or more protected data fields and (ii) each unprotected data value is associated with a respective unprotected data field of one or more unprotected data fields;
for each protected data value, generate a masked representation;
generate a masked user interface that comprises: (i) each unprotected data value and (ii) each masked representation; and
cause the masked user interface to be presented using a display device.

14. The apparatus of claim 13, wherein the protected mode display request is generated in response to receiving a request to display the requested user interface and determining a protected mode selection indicator describes an affirmative indicator value.

15. The apparatus of claim 14, wherein:
the requested user interface is part of a sequence of requested user interfaces that a user has requested to display, and
the affirmative indicator value is determined based on a user selection action that is performed while a first requested user interface in the sequence of requested user interfaces is being displayed to the user.

16. The apparatus of claim 15, wherein the user selection action comprises toggling a protected mode selection user interface element to an affirmative state.

17. The apparatus of claim 13, wherein the masked representation for a respective protected data value comprises a mask user interface element.

18. The apparatus of claim 13, wherein the masked representation for a respective protected data value comprises a masked data value that is different from the respective protected data value.

19. The apparatus of claim 18, wherein the masked data value is a randomly-generated data value.

20. A computer program product for protected mode display of a requested user interface, the computer program product comprising at least one non-transitory computer-readable storage medium storing software instructions that, when executed, cause an apparatus to:
receive a protected mode display request to display the requested user interface in a protected mode, wherein the requested user interface comprises a plurality of data values each associated with a respective data field of a plurality of data fields; and
in response to the protected mode display request:
retrieve a data protection template for the protected mode display request, wherein the data protection template defines one or more protected data fields of the plurality of data fields,
determine, based on the data protection template, one or more protected data values of the plurality of data values and one or more unprotected data values of the plurality of data values, wherein: (i) each protected data value is associated with a respective protected data field of the one or more protected data fields and (ii) each unprotected data value is associated with a respective unprotected data field of one or more unprotected data fields,
for each protected data value, generate a masked representation,
generate a masked user interface that comprises: (i) each unprotected data value, and (ii) each masked representation; and
cause the masked user interface to be presented using a display device.

* * * * *